United States Patent

Masumoto et al.

[11] Patent Number: 6,062,834
[45] Date of Patent: May 16, 2000

[54] SCROLL COMPRESSOR

[75] Inventors: Kouji Masumoto; Hiroshi Nakashima; Fumiaki Sano; Kiyoharu Ikeda, all of Tokyo, Japan

[73] Assignee: Mitsubishi Denki Kabushiki Kaisha, Tokyo, Japan

[21] Appl. No.: 08/958,985

[22] Filed: Oct. 28, 1997

[30] Foreign Application Priority Data

Jun. 6, 1997 [JP] Japan ................................. 9-148839

[51] Int. Cl.[7] ...................................................... F01C 1/02
[52] U.S. Cl. ........................ 418/55.4; 418/55.5; 418/55.6; 418/57
[58] Field of Search ................................ 418/55.4, 55.5, 418/57, 55.6, 55.1

[56] References Cited

U.S. PATENT DOCUMENTS

| 5,103,652 | 4/1992 | Mizuno et al. | 418/55.6 X |
| 5,591,018 | 1/1997 | Takeuchi et al. | 418/55.6 X |
| 5,645,408 | 7/1997 | Fujio et al. | 418/55.4 |
| 5,688,109 | 11/1997 | Matsuura et al. | 418/55.6 X |
| 5,746,586 | 5/1998 | Fukuhara et al. | 418/55.5 X |

FOREIGN PATENT DOCUMENTS 1-105786  7/1984  Japan .
1-277694  11/1989  Japan .

*Primary Examiner*—Hoang Nguyen
*Attorney, Agent, or Firm*—Oblon, Spivak, McClelland, Maier & Neustadt, P.C.

[57] ABSTRACT

In a scroll compressor, a clearance is made between the opposed faces of a bed plate of a fixed scroll and a stationary member and a compression gas is introduced into the clearance for pressing the fixed scroll against an orbiting scroll. A recess is made in the center of the stationary member, is surrounded by a muffler, and is formed with a discharge hole directed in a radial direction. The scroll compressor can be assembled efficiently.

6 Claims, 8 Drawing Sheets

SCROLL COMPRESSOR

BACKGROUND OF THE INVENTION

This invention relates to a scroll compressor used with an air conditioner, a refrigerator, etc., and having a fixed scroll movable in an axial direction.

FIG. 9 is a sectional view of a conventional scroll compressor with a fixed scroll movable in an axial direction shown in Japanese Patent Laid-Open No. Sho 63-80088, wherein numeral 1 is a fixed scroll formed with plate-like spiral teeth 1b on one side of a bed plate 1a. Numeral 2 is an orbiting scroll formed with a plate-like spiral teeth 2b on one side of a bed plate 2a and a projected boss part 2c receiving a driving force of an electric motor 8 from a main shaft 7 on the opposite side. The plate-like spiral teeth 1b of the fixed scroll 1 and the plate-like spiral teeth 2b of the orbiting scroll 2 are used in combination to form a compression space 6.

Numeral 3 is a frame fixedly secured to a closed vessel 9 on the outer periphery of the frame for supporting a thrust load of the orbiting scroll 2 and also supporting the main shaft 7 in the radial direction.

Numeral 10 is a plate spring formed with four drilled holes for bolts with bolts inserted in the two drilled holes at both ends for fixing the plate spring to the upper end face of the extension of the bed plate 1a of the fixed scroll 1 and with bolts inserted in the two drilled holes at the center for fixing the plate spring to the upper end face of the frame 3, whereby the fixed roll 1 and the frame 3 are elastically coupled in the axial direction and fixedly coupled in the radial direction and in the rotation direction around the axis by the plate spring 10.

Numeral 15 is a suction pipe for sucking a low-pressure gas. Numeral 23 is an oil pool for supply to a slide part of a compressor bearing, etc.

The upper part of the bed plate 1a of the fixed scroll 1 defines first and second concentric pistons 31 and 32 fitted so as to slide to first and second concentrically placed cylinder chambers 36 and 37 formed by a cover member 33. The first cylinder chamber 36 is sealed with the second cylinder chamber 37 by a first flexible seal member 34 disposed on the cylindrical face of the first piston 31 and the second cylinder chamber 37 is sealed with the low-pressure side by a second flexible seal member 35 on the cylindrical face of the second piston 32.

Numeral 1c is a discharge port of the fixed scroll. A refrigerant gas compressed in the compression space 6 enters the first cylinder chamber 36 via the discharge port 1c and enters a gas discharge chamber 39 via an opening 38 and is discharged from the discharge chamber 39 through a discharge pipe to the outside of the compressor.

Numeral 1d is an extraction hole through which the compression space during compression communicates with the second cylinder chamber 37 for introducing intermediate-pressure refrigerant gas into the second cylinder chamber 37.

The conventional scroll compressor compresses low-pressure refrigerant gas sucked through the suction pipe 15 by orbiting motion of the orbiting scroll 2 in the compression space 6 and discharges the gas from the discharge port 1c via the first cylinder chamber 36, the opening 38, and the gas discharge chamber 39 to the outside of the compressor through the discharge pipe in the gas discharge chamber 39.

The fixed scroll 1 can be moved axially by elastic deformation of the plate spring 10. Discharge pressure of the first cylinder 36 acts on the first piston 31 and intermediate pressure of the second cylinder 37 acts on the second piston 32, pressing the fixed scroll 1 against the orbiting scroll 2 for energizing sealing between the fixed and orbiting scrolls.

Since the conventional scroll compressor is thus configured, the first flexible seal member 34 for separating discharge pressure and intermediate pressure and the second flexible seal member 35 for separating intermediate pressure and low pressure are disposed in the first piston 31 and the second piston 32 of the upper cylindrical portion of the bed plate 1a of the fixed scroll 1. In this case, there are two cylindrical face fits when the fixed scroll 1 is combined with the cover member 33, and assembly is poor. In addition, there is clearance imbalance in the fit caused by a work error, and a sealing failure in seal points easily occurs.

SUMMARY OF THE INVENTION

It is therefore an object of the invention to provide a scroll compressor comprising a fixed scroll that can be moved axially and is pressed against an orbiting scroll by compression gas introduced into the rear of a bed plate of the fixed scroll and more particularly to a high-efficiency, high-reliability scroll compressor which is excellent in assembly, is free of a seal failure in seal parts of the compression gas for pressing the fixed scroll, and has a liquid injection function.

To the end, according to a first aspect of the invention, there is provided a scroll compressor comprising fixed scroll axial move means for axially moving a fixed scroll, wherein a clearance is made between the bed plate of the fixed scroll and the stationary member and in the clearance, a high-pressure compression gas is introduced into a high-pressure chamber surrounded by an inner seal material and an intermediate-pressure compression gas is introduced into an intermediate-pressure chamber surrounded by an inner seal member and an outer seal member for pressing the fixed scroll against the orbiting scroll under pressure of the compression gases, characterized in that a recess communicating with the compression space is made at the center of the stationary member, that a muffler is attached so as to surround the recess, and that a discharge hole directed in a radial direction is made in the recess for discharging the compression gases through the discharge hole to the outside of the closed vessel.

The scroll compressor according to a second aspect of the invention further includes a discharge pipe for discharging the compression gases to the outside of the closed vessel through the discharge hole directed in the radial direction, made in the recess of the stationary member and a discharge connection pipe for connecting the discharge pipe and the closed vessel in the first aspect of the invention, the discharge connection pipe having a large diameter part and a small diameter part and being shaped so as to increase in diameter toward the inside of the closed vessel and fixedly secured to the closed vessel in the large diameter part and the discharge pipe in the small diameter part.

In the scroll compressor according to a third aspect of the invention, an opening diameter of the muffler on the stationary member side and an opening diameter of the recess of the stationary member are each equal to or less than a diameter of a groove for housing the outer seal material and equal to or more than a diameter of a groove for housing the inner seal material in the first aspect of the invention.

In the scroll compressor according to a fourth aspect of the invention, a liquid injection port of the fixed scroll and a liquid injection port of the stationary member are made to hermetically communicate with each other in a liquid injection seal in a clearance between the fixed scroll and the stationary member and a liquid injection pipe is connected to a liquid injection hole made in the radial direction of the stationary member communicating with the liquid injection port of the stationary member in the first aspect of the invention.

The scroll compressor according to a fifth aspect of the invention further includes a liquid injection connection pipe for connecting the liquid injection pipe and the closed vessel, the liquid injection connection pipe having a large diameter part and a small diameter part and being shaped so as to increase in diameter toward the inside of the closed vessel and fixedly secured to the closed vessel in the large diameter part and the liquid injection pipe in the small diameter part in the fourth aspect of the invention.

In the scroll compressor according to a sixth aspect of the invention, a notch is made in an entrance side corner of a groove for housing a seal material disposed in a clearance between the opposed faces of the bed plate of the fixed scroll and the stationary member in the first aspect of the invention.

DETAILED DESCRIPTION OF THE PREFERRED EMBODIMENTS

Embodiment 1:

First, a first embodiment of the invention will be discussed with reference to FIG. 1, which is a sectional view of a scroll compressor of a first embodiment of the invention.

Figure 1:
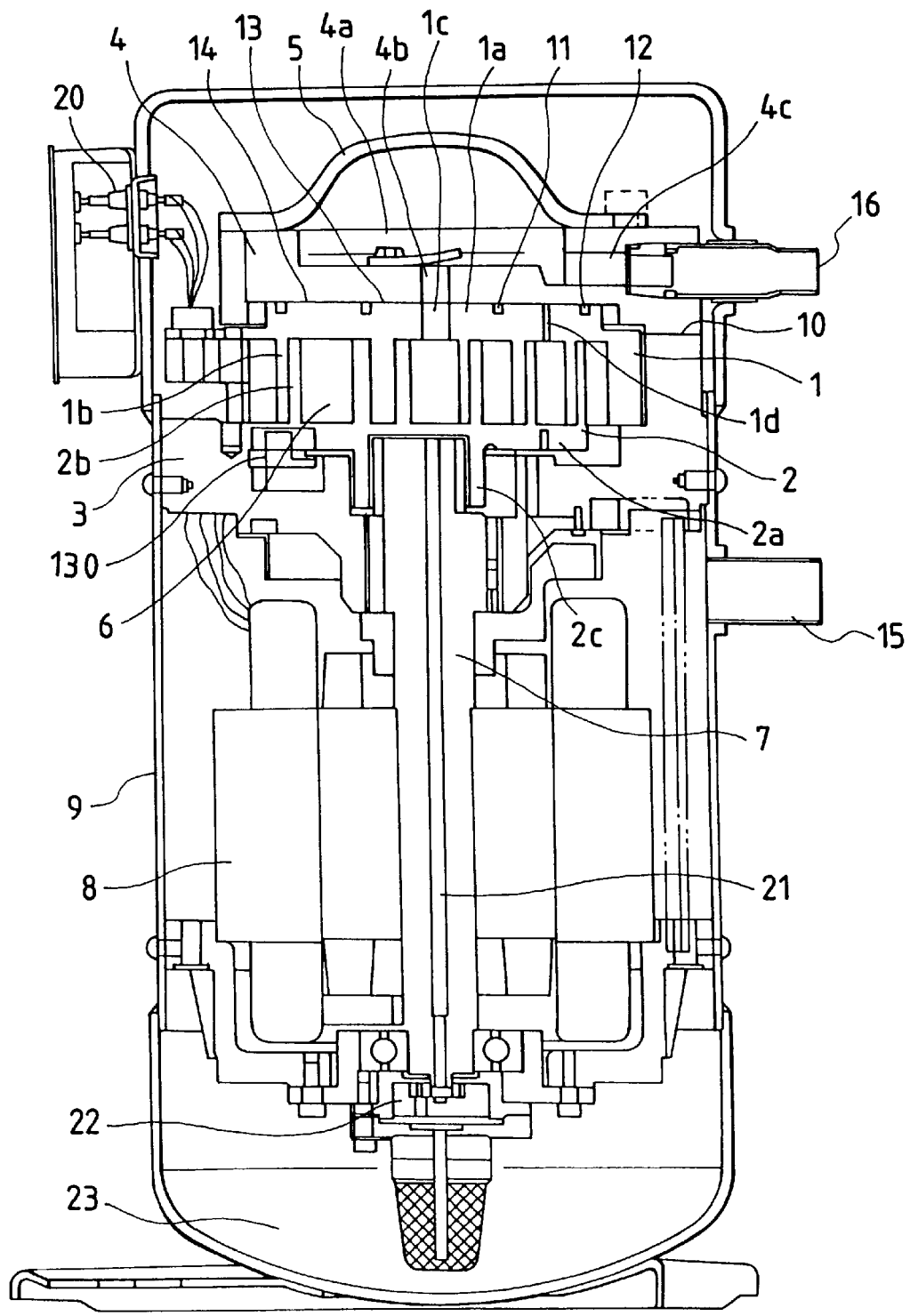
FIG. 1 is a sectional view of a scroll compressor to show a first embodiment of the invention.

In FIG. 1, numeral 1 is a fixed scroll formed with plate-like spiral teeth 1b on one side (lower side) of a bed plate 1a. Numeral 2 is an orbiting scroll formed with a plate-like spiral teeth 2b on one side (upper side) of a bed plate 2a and a projected boss part 2c receiving a driving force from a main shaft 7 on the opposite side (lower side). The main shaft 7 is rotated by an electric motor 8. The plate-like spiral teeth 1b of the fixed scroll 1 and the plate-like spiral teeth 2b of the orbiting scroll 2 are combined with a 180-degree phase to form a compression space 6.

Numeral 3 is a frame fixedly secured to a closed vessel 9 on the outer periphery of the frame for supporting a thrust load of the orbiting scroll 2 and also supporting the main shaft 7 in the radial direction by means of a bearing.

Numeral 4 is a stationary member formed with a cylindrical recess 4a in an upper part and fixed to the upper end face of the frame 3 together with a plate spring 10 (described later) with bolts.

Numeral 5 is a muffler fixed to the upper end face of the outside of the cylindrical recess 4a of the stationary member 4 with bolts via a seal member. A high-pressure gas is introduced into the muffler 5 via the innermost space of the compression space 6, a discharge port 1c of the fixed scroll 1, and a discharge port 4b of the stationary member 4, producing a high-pressure space in the muffler 5 and a low-pressure space in the outside of the muffler.

Numeral 10 is a plate spring for forming fixed scroll axial move means. It is made of a plate-like elastic member and is sandwiched between the outer peripheral part of the bed plate 1a of the fixed scroll 1 and the outer peripheral part of the frame 3. The plate spring 10 is formed with four reamer holes. Reamer bolts are inserted in the two reamer holes at both ends for fixing the plate spring 10 to the outer peripheral part of the bed plate 1a of the fixed scroll 1. Reamer bolts are inserted in the two reamer holes at the center for fixing the plate spring 10 to the upper end face of the outer peripheral part of the frame 3. This means that the fixed scroll 1 is elastically coupled to the frame 3 in the axial direction and is physically fixedly coupled in the radial direction and in the rotation direction around the axis by the plate spring 10; the fixed scroll 1 does not shift during the operation.

A groove for housing an inner seal member 11 for separating high pressure and intermediate pressure and a groove for housing an outer seal member 12 for separating intermediate pressure and low pressure are made in the face (upper side face) opposite to the side where the plate-like spiral teeth 1b of the bed plate 1a of the fixed scroll 1 are formed.

A clearance surrounded by the fixed scroll 1, the stationary member 4, and the inner seal member 11 is formed and communicates with the discharge port 1c communicating with the innermost compression space 6 of the fixed scroll 1, forming a high-pressure chamber 13 into which high pressure is introduced. A clearance surrounded by the fixed scroll 1, the stationary member 4, the inner seal member 11, and the outer seal member 12 is formed; intermediate pressure is introduced into the clearance through an extraction hole 1d opened to the compression space 6 of intermediate pressure during compression, forming an intermediate-pressure chamber 14. The inner and outer seal members 11 and 12 provide sealing between the two facing radial surfaces of the fixed scroll 1 and the stationary member 4.

Numeral 130 is an Oldham's coupling for restraining rotation of the orbiting scroll 2 and determining a phase between the orbiting scroll 2 and the frame 3.

Numeral 20 is a glass terminal fixedly secured to a low-pressure space on the top of the closed vessel 9 above the compression chamber 6 and connected to a lead wire of the electric motor 8.

Numeral 15 is a suction pipe opened in the proximity of the top of the electric motor 8. It is fixedly secured to the closed vessel 9 for introducing a low-pressure compression gas into the closed vessel 9.

The stationary member 4 is formed with a discharge hole 4c in the radial direction. The discharge hole 4c penetrates a wall of the cylindrical recess 4a and is opened at one end to the cylindrical recess 4a and a discharge pipe 16 is inserted into the other end via a seal member such as an O ring. The discharge pipe 16 is fixed to the top of the closed vessel 9 for introducing a high-pressure compression gas into the outside of the scroll compressor.

The muffler 5 is fixed to the upper end face of the stationary member 4 so as to surround the recess 4a of the stationary member so that the opening diameter of the muffler 5 on the stationary member 4 side becomes equal to or less than the diameter of the groove for housing the outer seal member 12 of the bed plate 1a of the fixed scroll 1 and becomes more than the diameter of the groove for housing the inner seal member 11.

The groove made in the fixed scroll 1 may be made in the fixed scroll 1 side of the stationary member 4 forming a clearance.

Next, the operation of the scroll compressor of the embodiment will be discussed.

The main shaft 7 is rotated by the electric motor 8 and the orbiting scroll 2 is driven by the main shaft 7, whereby the low-pressure refrigerant gas introduced through the suction pipe 15 moves from bottom to top in the closed vessel 9 while it cools the electric motor 8, enters the compression space 6 defined by the plate-like spiral teeth 1b and 2b of the fixed scroll 1 and the orbiting scroll 2, moves from the outside of the compression space to the center, is compressed to high pressure, enters high-pressure space surrounded by the cylindrical recess 4a of the stationary member 4 and the muffler 5 through the discharge port 1c of the fixed scroll 1 and the discharge port 4b of the stationary member, is suppressed in pulsation owing to the muffler effect, and is discharged through the discharge pipe 16 to the outside of the compressor.

Next, the axial move mechanism of the fixed scroll 1 of the scroll compressor will be discussed.

When the scroll compressor is operated normally, an upward pressing-up force in the axial direction caused by gas pressure in the compression space acts on the fixed scroll 1, high pressure acts on the rear of the fixed scroll 1 and the high-pressure chamber 13 on the center side of the inner seal member 11, and intermediate-pressure acts on the portion exposed to the intermediate-pressure chamber 14 between the inner seal member 11 and the outer seal member 12. The high pressure and intermediate pressure cause the fixed scroll to be pressed downward; the diameters of the high-pressure chamber 13 and the intermediate-pressure chamber 14 are selected appropriately, whereby the fixed scroll 1 is pressed downward, namely, against the orbiting scroll 2 under proper pressure.

The fixed scroll 1 is coupled to the frame 3 via the plate spring 10 of an elastic member and therefore the fixed scroll 1 is elastically coupled to the frame 3 in the axial direction and is physically fixedly coupled in the radial direction and in the rotation direction around the axis by the plate spring 10; the fixed scroll 1 does not shift during the operation.

Thus, at the normal operation time, the fixed scroll 1 is always pressed against the orbiting scroll 2 in the axial direction by a proper predetermined force and the plate-like spiral teeth 1b and 2b come in follow-up contact with the inner faces on the compression space sides of the bed plates 2a and 1a under proper predetermined pressure, removing a clearance, preventing the gas from leaking at the compression time, and providing an efficient scroll compressor.

When the compressor is started, etc., if a refrigerant dissolves in lubricating oil, liquid compression occurs, and pressure in the compressor abnormally rises, the fixed scroll 1 is pushed up and relieved in the axial direction and the plate-like spiral teeth 1b and 2b form a clearance with the inner faces on the compression space sides of the bed plates 2a and 1a and high pressure is released from the clearance, thereby preventing damage to the plate-like spiral teeth, etc.

The fixed scroll can move upward in the axial direction in the range until it abuts the stationary member 4; it can move downward in the axial direction in the range until the plate-like spiral teeth 1b abut the inner face on the compression space side of the bed plate 2a of the orbiting scroll 2.

In the embodiment, the muffler 5 is fixed to the upper end face of the stationary member 4 so as to surround the recess 4a of the stationary member so that the opening diameter of the muffler 5 on the stationary member 4 side becomes equal to or less than the diameter of the groove for housing the outer seal member 12 of the bed plate 1a of the fixed scroll 1 and becomes more than the diameter of the groove for housing the inner seal member 11. Thus, the stationary member 4 does not become deformed due to an unbalanced load caused as the differential pressure between pressure from the top and pressure from the bottom in the axial direction becomes large.

That is, the upper area of the stationary member 4 to which high pressure in the muffler 5 is applied is equal to or less than the lower area to which high pressure and intermediate pressure are applied, and is equal to or more than the area to which high pressure is applied, so that deformation caused by the unbalanced load of the stationary member 4 is suppressed and a pressure leak from the seal part of the inner or outer seal member.

In the embodiment, the muffler 5 can accomplish the pulsation prevention effect as a muffler while preventing a pressure leak from the seal part as described above.

Further, the muffler capacity can be changed by changing the size of the cylindrical recess 4a of the stationary member 4.

In the embodiment, the discharge pipe 16 is inserted in the discharge hole 4c made in the wall of the cylindrical recess 4a of the stationary member 4. Thus, the hermetic follow-up mechanism of the scroll spiral teeth 1b and 2b by an axial move of the fixed roll 1 can be accomplished without interfering with the axial move of the fixed roll 1. Moreover, the discharge pipe 16 is projected from the closed vessel 9 in the radial direction, so that the height dimension of the compressor can be suppressed.

In the embodiment, the plate spring 10 for coupling the outer periphery of the bed plate 1a of the fixed scroll 1 and the outer periphery of the frame 3 is taken as an example of the fixed scroll axial move means for moving the fixed scroll 1 in the axial direction, but the invention is not limited to it. For example, the following may be adopted as the fixed scroll axial move means: A cylindrical recess is made below the stationary member 4, the bed plate 1a of the fixed scroll 1 is fitted into the recess, and the fixed scroll 1 is axially slid with the recess as a guide.

Figure 2:
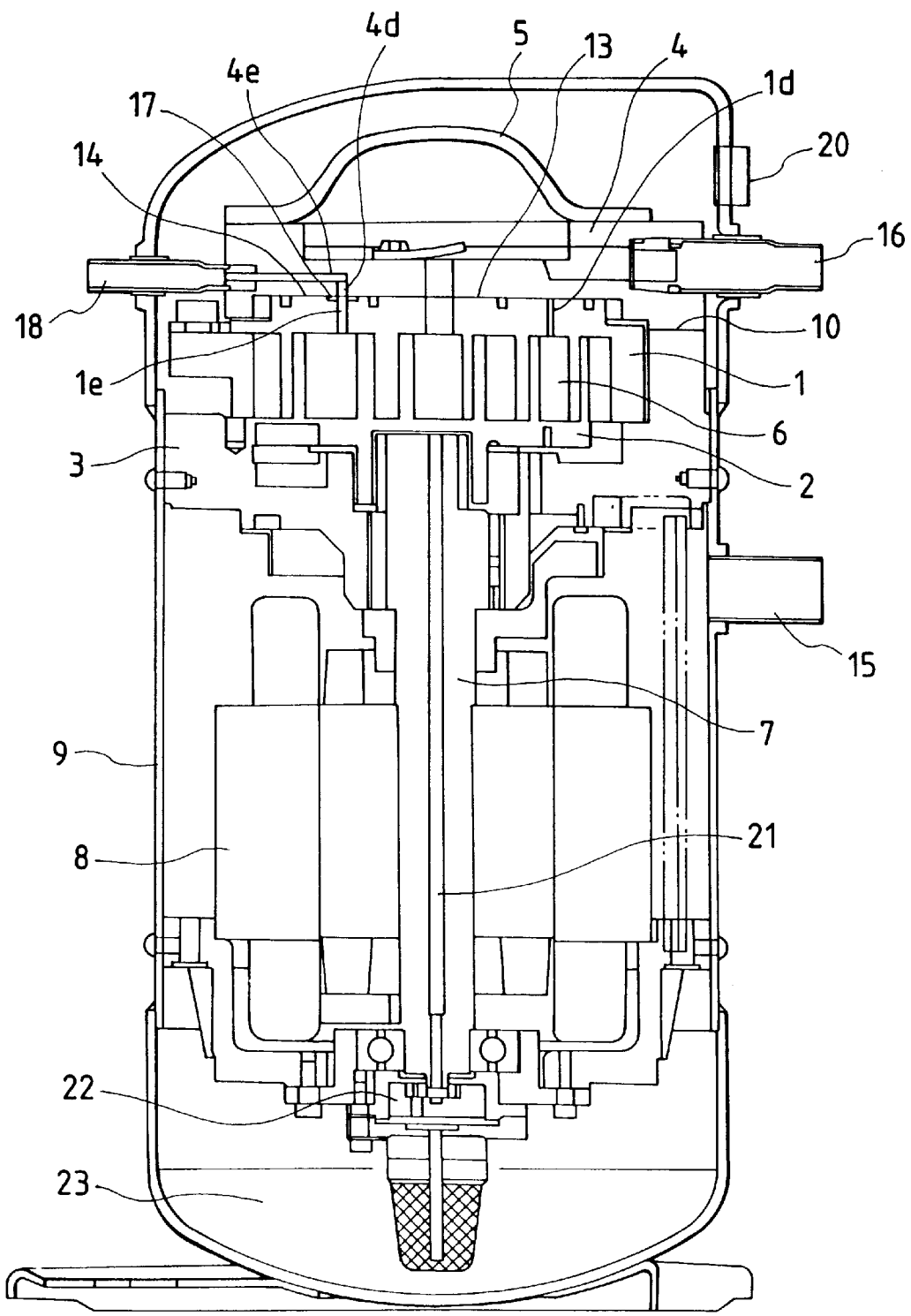
FIG. 2 is a sectional view of a scroll compressor to show a second embodiment of the invention.
Figure 3:
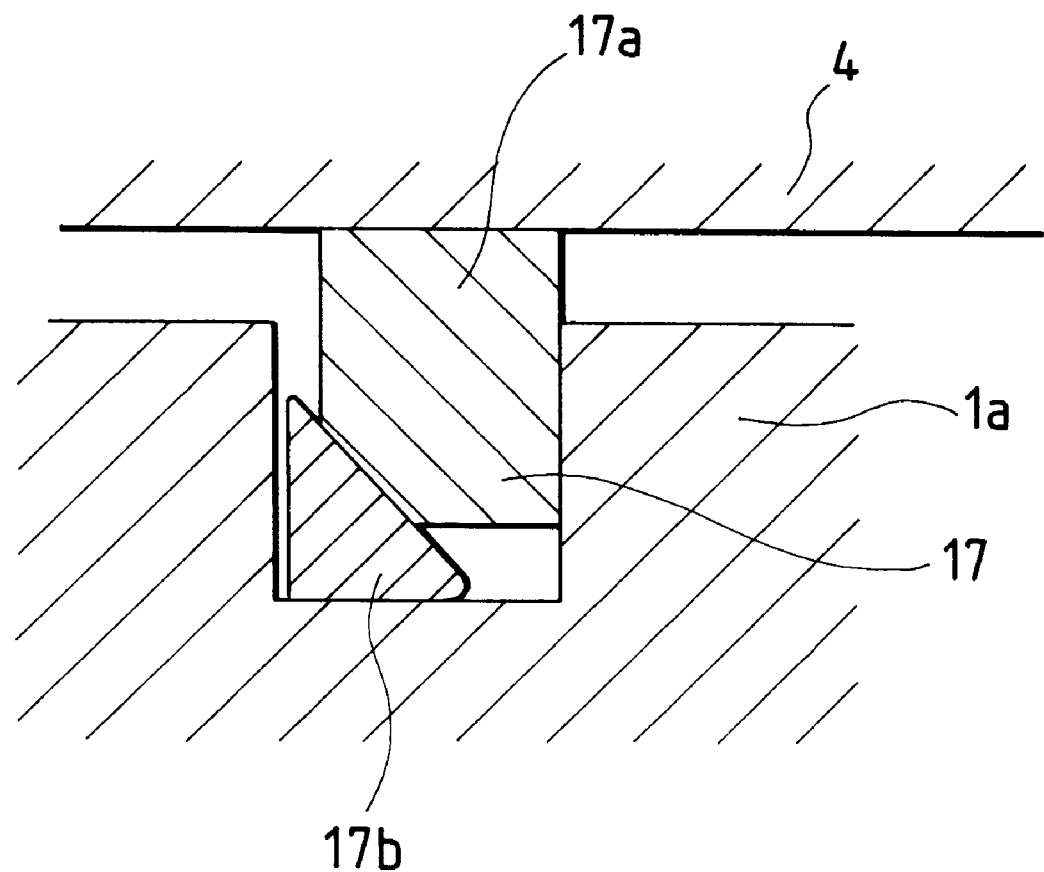
FIG. 3 is an enlarged view of the main part to show a seal of an injection port in the second embodiment of the invention.

The stationary member 4, the fixed scroll 1, and the frame 3 may be positioned by reamer pins as an axial move guide and position restriction in the radial and rotation directions.
Embodiment 2:

FIG. 2 is a sectional view of a scroll compressor of a second embodiment of the invention. FIG. 3 is a partially enlarged view to explain a seal for separating injection ports in an intermediate pressure-chamber in the second embodiment. Parts similar to those previously described with reference to FIG. 1 are denoted by the same reference numerals in FIGS. 2 and 3 and will not be discussed again.

In FIGS. 2 and 3, numeral 1e is a liquid injection port of a fixed scroll disposed in a bed plate 1a of a fixed scroll 1. The liquid injection port 1e extends from one end of an opening opened to a compression space during compression and is opened at the other end to the upper face of the bed plate 1a of the fixed scroll 1. Numeral 4d is a liquid injection port of a stationary member disposed in a stationary member 4. The liquid injection port 4d extends from one end of an opening opened to the lower end face of the stationary member 4 and communicates at the other end with a liquid injection hole 4e extending radially from an opening opened to the side end face of the stationary member 4 in the stationary member 4.

The opening of the liquid injection port 1e of the fixed scroll 1 in the upper face of the bed plate 1a of the fixed scroll 1 and the opening of the liquid injection port 4d of the stationary member 4 in the lower face of the stationary member 4 communicate with each other in the area of an intermediate-pressure chamber 14 between the bed plate 1a of the fixed scroll 1 and the stationary member 4 and are separated by a liquid injection seal member 17 disposed in a ring-like groove made in the upper end face of the bed plate 1a of the fixed scroll 1 so as not to communicate with the intermediate-pressure chamber 14.

Numeral 18 is a liquid-injection pipe inserted into the opening of the liquid injection hole 4e in the side end face of the stationary member 4 via a seal member such as a U ring. The liquid injection pipe 18 is fixed in a part to a closed vessel 9 and is connected to a condenser exit of a refrigeration cycle by piping.

In FIG. 3, to attach the liquid injection seal member 17 disposed in the groove made in the upper end face of the fixed scroll 1, first a backup member 17b of an elastic member having a triangular cross section is attached to the ring-like groove in the upper end face of the bed plate 1a of the fixed scroll 1 so that a slope of the backup member 17b is set outside, then an end face seal member 17a of a pressure seal member having a pentagonal cross section is attached so that one face of the end face seal member 17a matches the slope of the backup member 17b.

A high-pressure liquid refrigerant is introduced into the closed vessel 9 through the liquid injection pipe 18 by piping branching from the condenser exit of a refrigeration cycle and is guided through the liquid injection hole 4e and the liquid injection port 4d of the stationary member 4 and the liquid injection port 1e of the fixed scroll 1 into the compression space 6 during compression, thereby executing liquid injection for lowering the temperature of the refrigerant during compression and preventing the discharge gas temperature from overrising.

The liquid injection may be always executed or when the discharge gas temperature overrises, it may be executed by adjusting or opening or closing a valve at an intermediate point of the piping.

Piping for always executing injection during the operation of the compressor through a capillary pipe and piping for opening or closing or adjusting the flow quantity through an on-off valve or a flow quantity regulating valve, etc., through a capillary pipe may be connected to the liquid injection pipe 18 in parallel for varying the injection amount in response to the discharge gas temperature.

The liquid injection ports 1e and 4d are sealed in the intermediate-pressure chamber 14 as follows:

In FIG. 3, when no injection is executed, the backup member 17b of an elastic member attempts to widen to the outer periphery side, thus the end face seal member 17a is lifted up and is pressed lightly against the stationary member 4. When liquid injection is executed during the operation of the compressor, high pressure of the liquid injection is brought in the rear of the end face seal member 17a and the end face seal member 17a is pressed against the stationary member 4 more reliably.

In the embodiment, the groove is made in the fixed scroll 1, but may be made in the stationary member 4.

A wave spring, etc., can also produce an effect similar to that of the backup member 17b triangular in cross section.

In the embodiment, the openings of the liquid injection ports 4d and 1e are opened in the area of the intermediate pressure chamber 14 and are separated so as not to communicate with the intermediate-pressure chamber 14 by the liquid injection seal member 17, but the liquid injection ports 4d and 1e may be opened in the area of the high-pressure chamber 13 and may be prevented from communicating with the high-pressure chamber 13 as described above.

Embodiment 3:

FIGS. 4(a), 4(b), 4(c), 5, and 6 are illustrations to show seal mechanisms for sealing the high-pressure chamber 13 and the intermediate-pressure chamber 14 of the scroll compressor shown in FIG. 1 or 2.

Figure 4A:
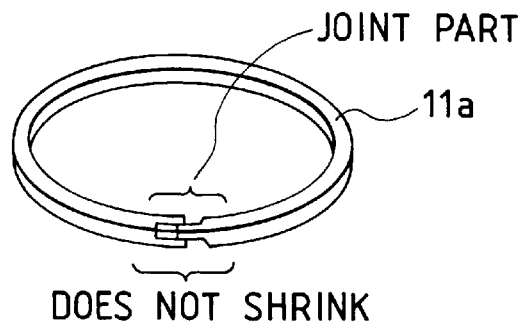
FIGS. 4(a) to 4(c) are illustrations to show a seal mechanism of a third embodiment of the invention.
Figure 4B:
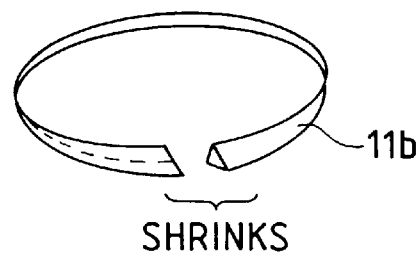
Figure 4C:
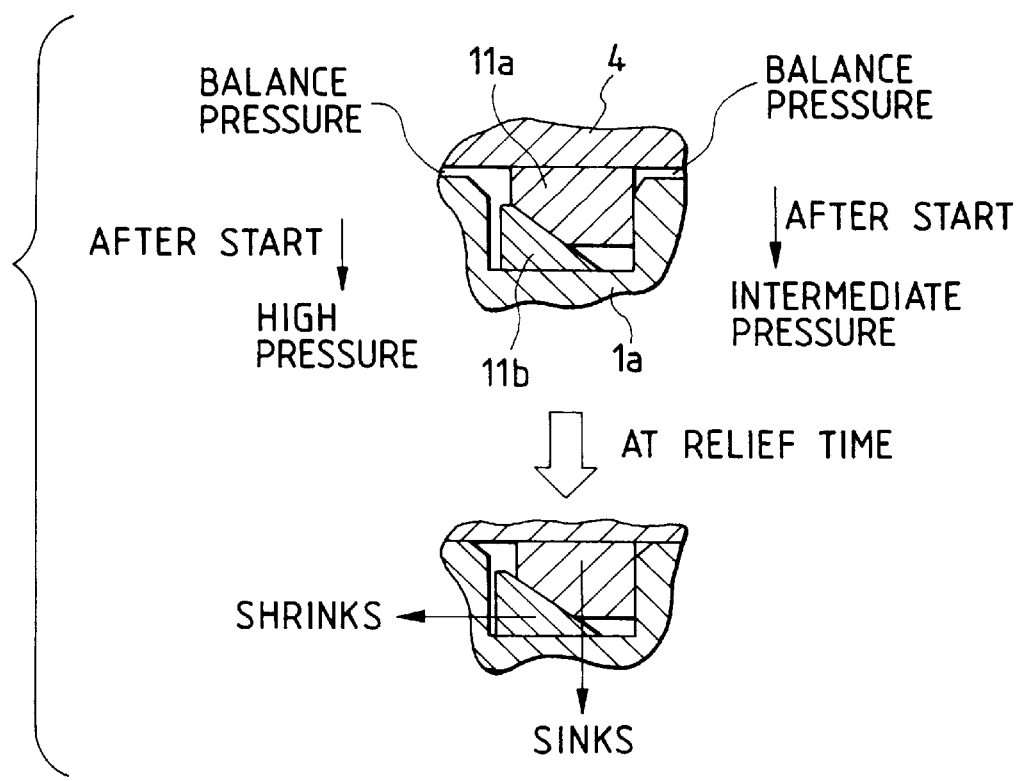

FIGS. 4(a) to 4(c) concern an inner seal for separating high pressure and intermediate pressure. FIG. 4(a) shows a pressure seal material 11a, which is a pressure seal material pentagonal in cross section having two faces almost at right angles to each other and a slope opposed thereto and made of Teflon, etc., for example. As shown in the figure, the pressure seal material 11a is shaped like a ring with the slope as the inside and the ring diameter can be adjusted at the joint part.

FIG. 4(b) shows a backup material 11b of an elastic member triangular in cross section having faces almost at right angles to each other and a slope. As shown in the figure, the backup material 11b is used as a ring shape with the slope as the outside. The inner seal material 11 is made up of the pressure seal material 11a and the backup material 11b.

FIG. 4(c) shows a state in which the pressure seal material 11a and the backup material 11b of the inner seal material for separating the high-pressure chamber and the intermediate-pressure chamber are fitted into a groove made in the upper end face of a fixed scroll. First, the backup material 11b is fitted into the groove with the slope of the triangular cross section upward and the slope of the pressure seal material 11a is put on the top of the slope of the backup material 11b. The upper corner of an entrance of the groove is chamfered as a notch and the axial dimension of the chamfer is set larger than the maximum relief amount.

We have discussed the inner seal material 11; the same comments apply to the outer seal material 12 although the relationship between high pressure and intermediate pressure becomes the relationship between intermediate pressure and low pressure of suction pressure.

The upper part of FIG. 4(c) shows a state in which the compressor stops or performs steady-state operation. When the compressor stops, the backup material 11b of an elastic member attempts to widen to the outer periphery side, thus the pressure seal material 11a is lifted up and is pressed lightly against a stationary member 4. In this state, if the compressor is started, intermediate pressure and high pressure are sealed immediately after the compressor is started. Thus, high pressure is brought in the rear of the pressure seal material 11a and the pressure seal material 11a is pressed right in FIG. 4(c) and is pressed against the stationary member 4 more reliably. When the compressor performs the steady-state operation, the state shown in FIG. 4(c) is also applied.

At the relief operation, pressure in a compression space increases abnormally and in FIG. 4(c), as the fixed scroll 1 approaches the stationary member 4, the pressure seal material 11a moves downward (sinks) relatively in the groove with the shape intact; the backup material 11b shrinks, namely, moves to the left in FIG. 4(c) and lessens in diameter.

The upper corner of the outer periphery of the pressure seal material 11a becomes deformed minutely in the circumferential direction because of a pressure difference, but the upper corner of the groove made in the fixed scroll 1 is chamfered and particularly the axial dimension of the chamfer is set larger than the maximum relief amount, thus preventing the upper corner of the pressure seal material 11a from being caught between the fixed scroll 1 and the stationary member 4 at the relief operation time, so that the fixed scroll can be relieved sufficiently.

In the embodiment, the groove is made in the fixed scroll 1, but may be made in the high and low pressure separator 4.

A wave spring, etc., may be used as the pressure seal material triangular in cross section.

Figure 5:
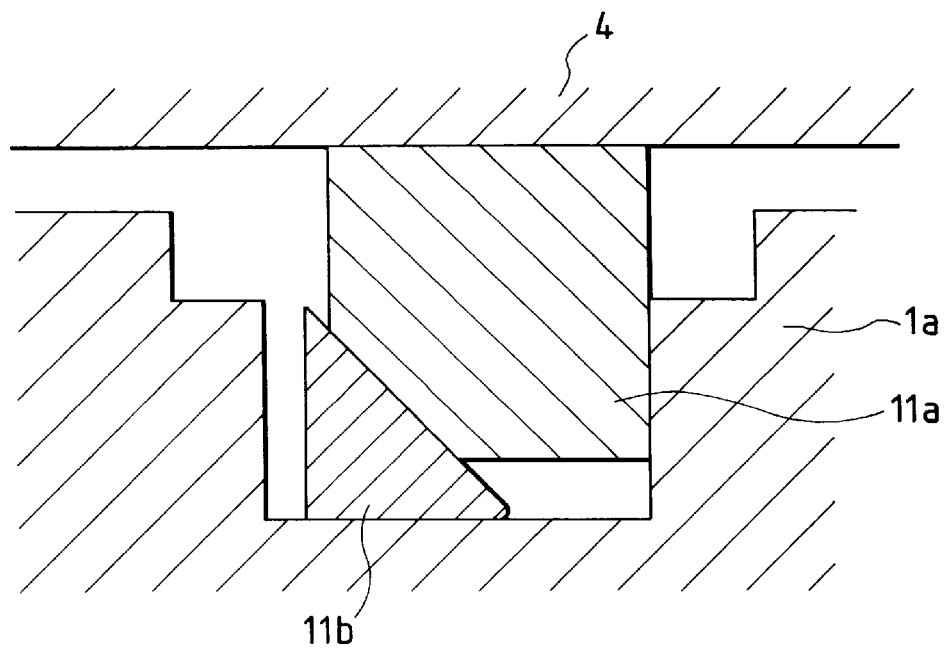
FIG. 5 is an illustration to show another seal mechanism of the third embodiment of the invention.

FIG. 5 shows a state in which the inner seal material 11 is fitted into the groove of the fixed scroll 1 like FIG. 4(c). In FIG. 5, a step of a notch is made in the upper corner of the entrance side of the groove of the fixed scroll 1. The depth of the step is set larger than the maximum relief amount of the fixed scroll 1, thus preventing the upper corner of the pressure seal material 11a from being caught between the fixed scroll 1 and the stationary member 4 at the relief operation time, so that the fixed scroll can be relieved sufficiently.

Figure 6:
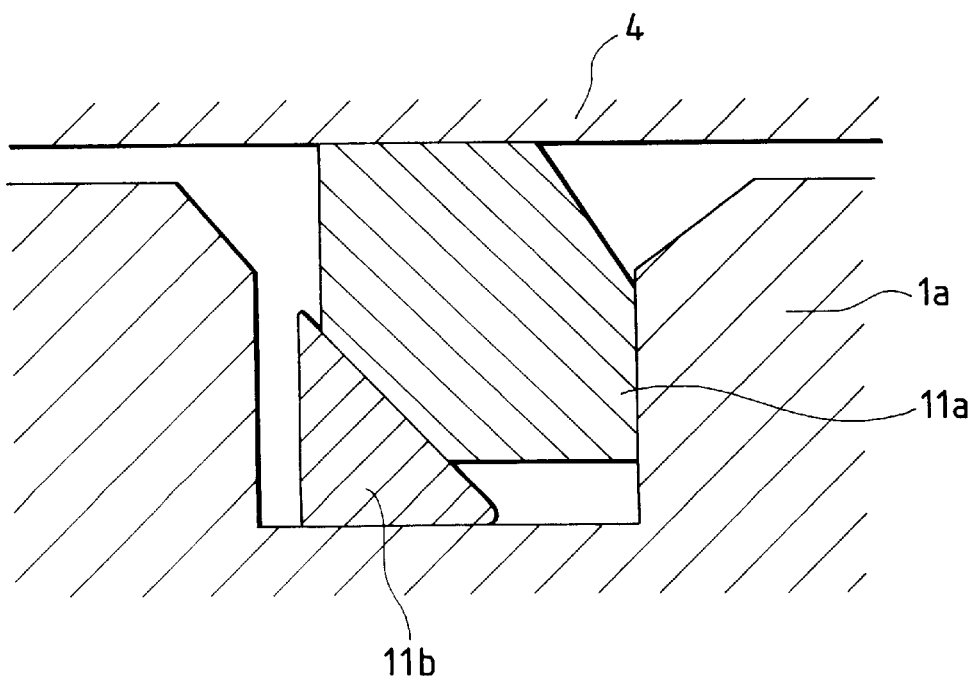
FIG. 6 is an illustration to show a still seal mechanism of the third embodiment of the invention.

As shown in FIG. 6, the pressure seal material 11a chamfered in the upper corner of the outer periphery may be fitted into the groove chamfered as a notch in the upper corner of the entrance side of the groove of the fixed scroll 1. At the time, the axial dimension relationship between the chamfers of the pressure seal material 11a and the groove of the fixed scroll 1 is set so that even when the fixed scroll 1 most lowers to the orbiting scroll 2 side, the lower edge of the chamfer of the pressure seal material 11a is placed below the lower edge of the chamfer of the groove of the fixed scroll 1 as in FIG. 6, thereby preventing the pressure seal material 11a from being cut by the chamfer edge of the groove of the fixed scroll 1.

Further, the pressure seal material 11a chamfered in the upper corner of the outer periphery may be fitted into the groove formed with the step in the upper corner shown in FIG. 5.

Figure 7:
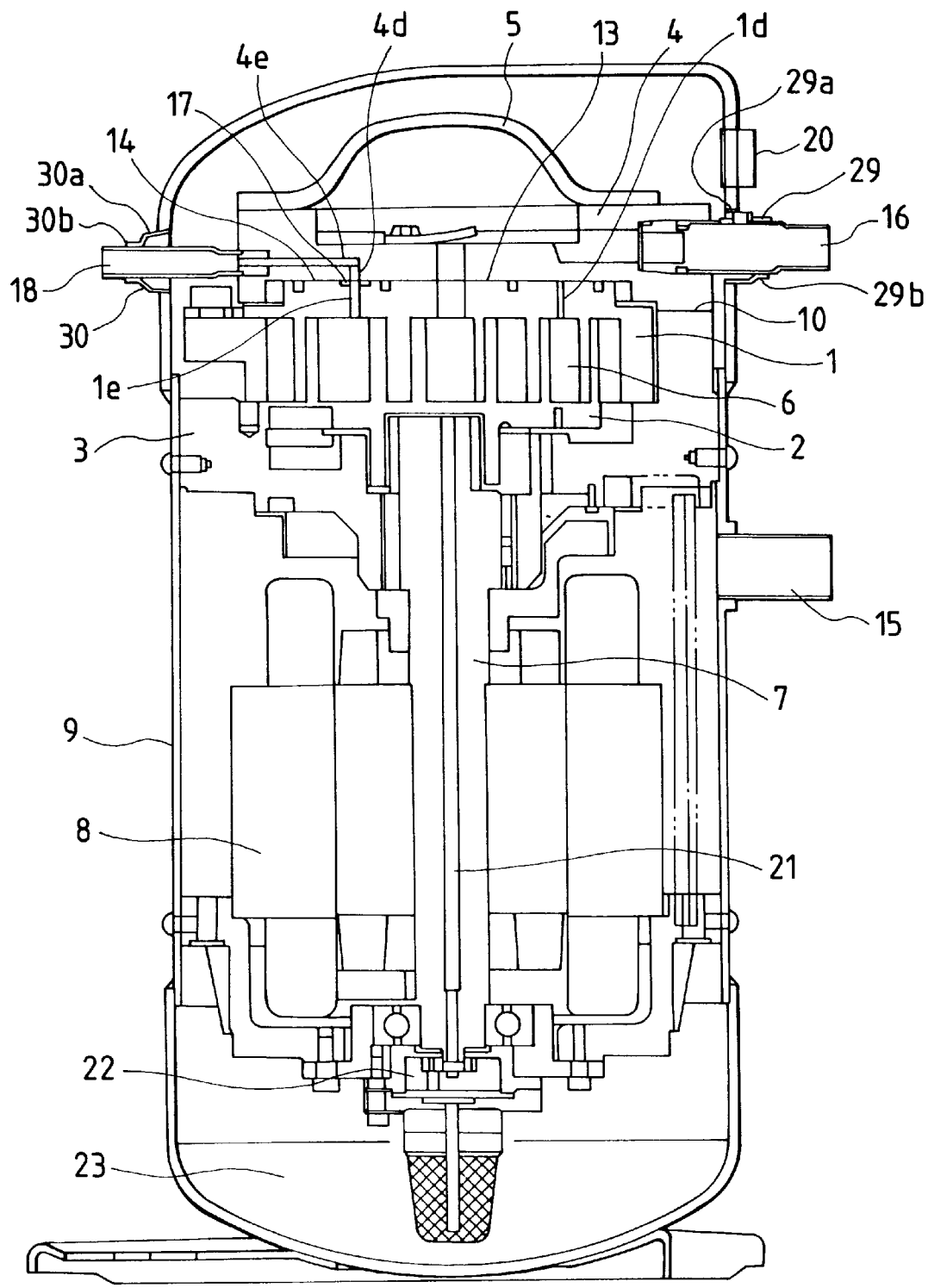
FIG. 7 is a sectional view of a scroll compressor to show a fourth embodiment of the invention.

Embodiment 4:

FIG. 7 is a sectional view of a scroll compressor of a fourth embodiment of the invention. Parts similar to those previously described with reference to FIGS. 1–6 are denoted by the same reference numerals in FIG. 7 and will not be discussed again.

In FIG. 7, numeral 29 is a discharge connection pipe. The discharge connection pipe 29 increases in diameter toward the inside direction of a closed vessel 9 and is shaped like a trumpet having a large diameter part 29a and a small diameter part 29b. The outer periphery of the large diameter part 29a is hermetically connected to the closed vessel 9 by brazing, etc. The inner periphery of the small diameter part 29b is hermetically connected to a discharge pipe 16 by brazing, etc.

Figure 8:
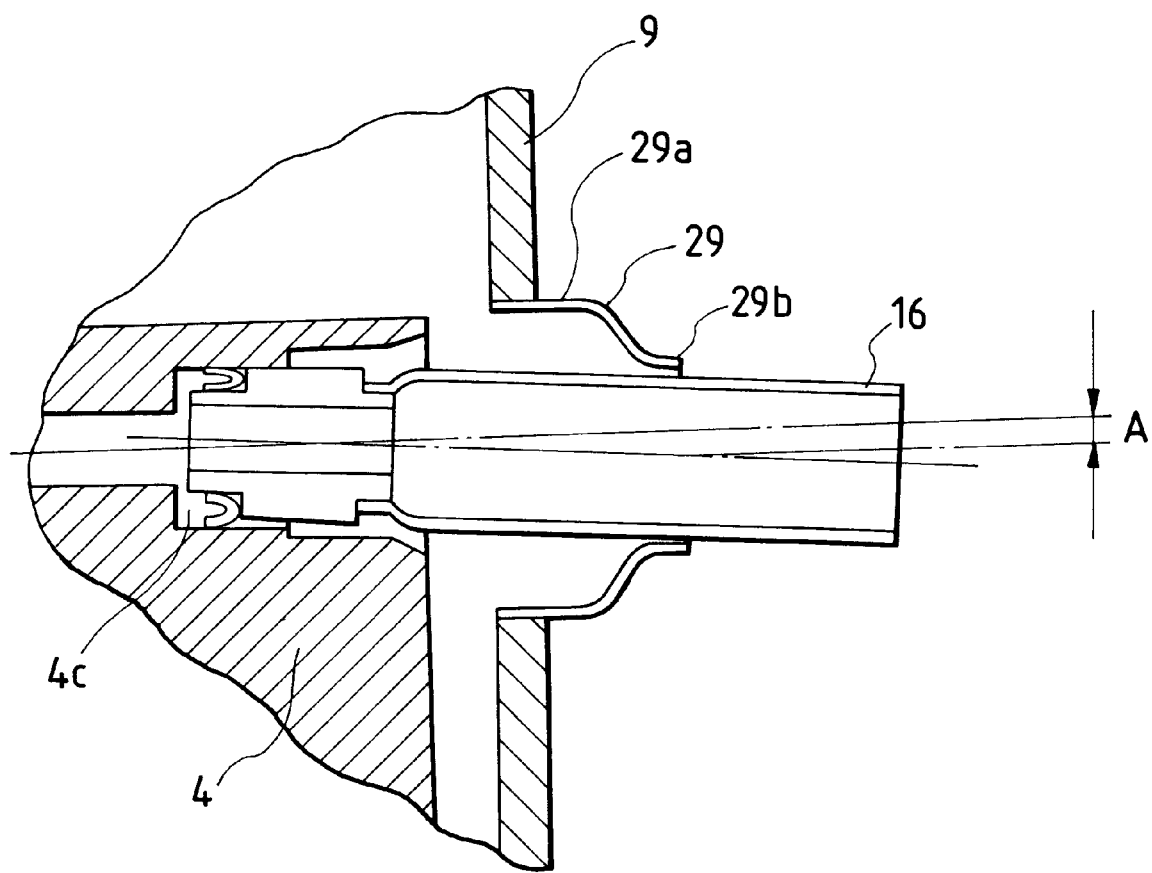
FIG. 8 is an enlarged view of the main part to show that a discharge pipe is inserted in a discharge hole and fixed to a discharge connection pipe in the fourth embodiment of the invention.
Figure 9:
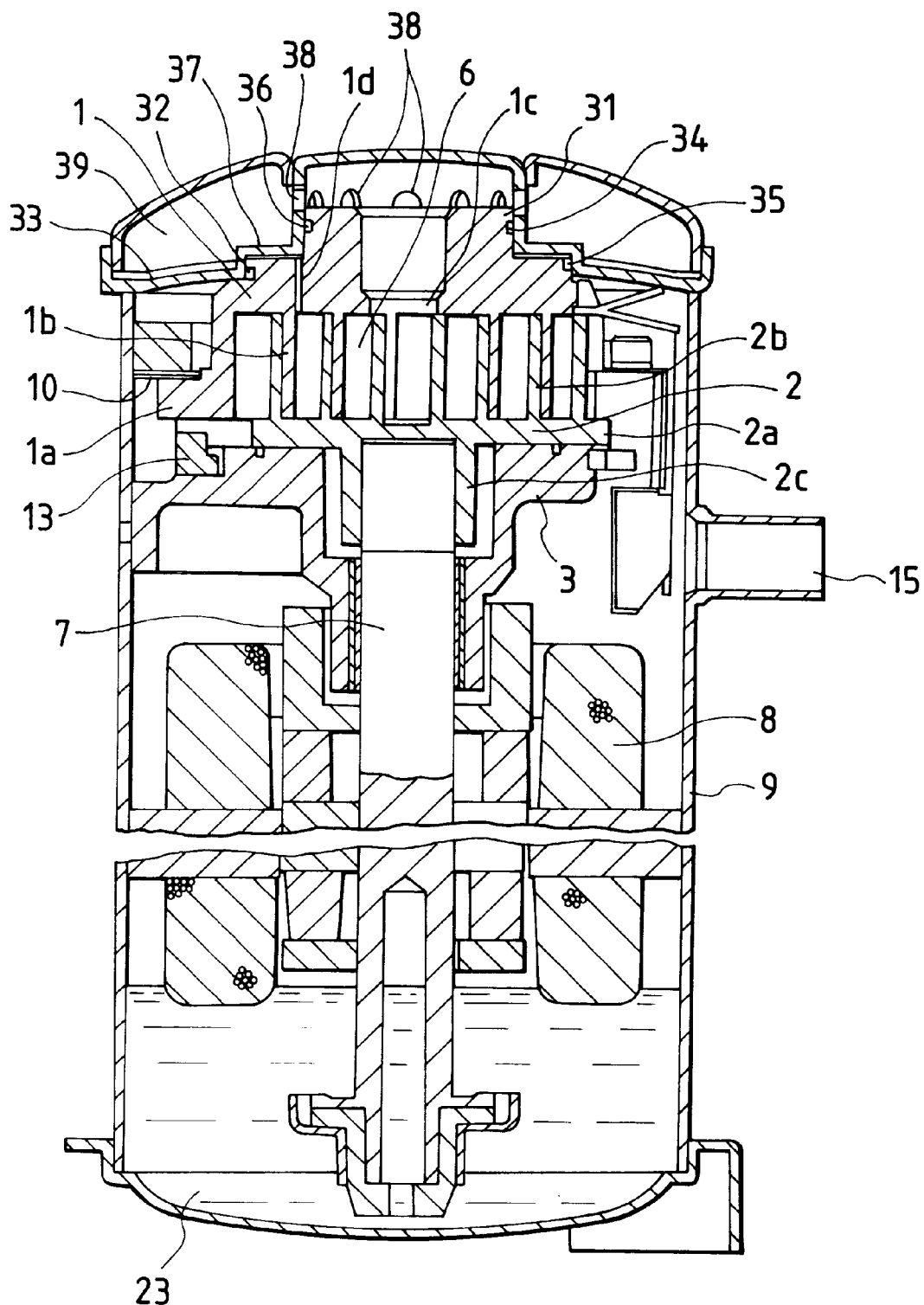
FIG. 9 is a sectional view to show a conventional scroll compressor.

Therefore, when the discharge pipe 16 is inserted, if a discharge hole 4c of a stationary member 4 and the discharge connection pipe 29 hermetically connected to the closed vessel 9 shift in position by A as shown in FIG. 8, the discharge pipe 16 can be inserted into the discharge connection pipe 29 without restriction even in a state in which the discharge pipe 16 is inclined because the discharge connection pipe 29 is shaped like a trumpet.

Then, if the positional accuracy between the discharge connection pipe 29 connected to the closed vessel 9 and the discharge hole 4c of the stationary member 4 is somewhat poor, the discharge pipe 16 can be assembled.

Numeral 30 is a liquid injection connection pipe. The liquid injection connection pipe 30 increases in diameter toward the inside direction of the closed vessel 9 and is shaped like a trumpet having a large diameter part 30a and a small diameter part 30b. The outer periphery of the large diameter part 30a is hermetically connected to the closed vessel 9 by brazing, etc. The inner periphery of the small diameter part 30b is hermetically connected to a liquid injection pipe 18 by brazing, etc.

Therefore, as with the discharge pipe 16, when the liquid injection pipe 18 is inserted, if the positional accuracy between the liquid injection connection pipe 30 connected to the closed vessel 9 and a liquid injection hole 4e of the stationary member 4 is somewhat poor, the liquid injection pipe 18 can be assembled.

As we have discussed, according to the first aspect of the invention, there is provided a scroll compressor comprising fixed scroll axial move means for axially moving a fixed scroll, wherein a clearance is made between the bed plate of the fixed scroll and the stationary member and in the clearance, a high-pressure compression gas is introduced into a high-pressure chamber surrounded by an inner seal material and an intermediate-pressure compression gas is introduced into an intermediate-pressure chamber surrounded by an inner seal member and an outer seal member for pressing the fixed scroll against the orbiting scroll under pressure of the compression gases, characterized in that a recess communicating with the compression space is made at the center of the stationary member, that a muffler is attached so as to surround the recess, and that a discharge hole directed in a radial direction is made in the recess for discharging the compression gases through the discharge hole to the outside of the closed vessel. Thus, the scroll compressor can be provided that can move the fixed scroll in the axial direction, is good in assembly of the stationary member, the fixed scroll, etc., and good in sealing of high pressure and intermediate pressure with the seal materials, and presses the fixed scroll against the orbiting scroll properly.

The scroll compressor according to the second aspect of the invention further includes a discharge pipe for discharging the compression gases to the outside of the closed vessel through the discharge hole directed in the radial direction, made in the recess of the stationary member and a discharge connection pipe for connecting the discharge pipe and the closed vessel in the first aspect of the invention, the discharge connection pipe having a large diameter part and a small diameter part and being shaped so as to increase in diameter toward the inside of the closed vessel and fixedly secured to the closed vessel in the large diameter part and the discharge pipe in the small diameter part. Thus, when the discharge pipe is inserted, if the positional accuracy between the discharge connection pipe connected to the closed vessel and the discharge hole of the stationary member is somewhat poor, the discharge pipe can be easily assembled with no problem on performance.

In the scroll compressor according to the third aspect of the invention, an opening diameter of the muffler on the stationary member side and an opening diameter of the recess of the stationary member are each equal to or less than a diameter of a groove for housing the outer seal material and equal to or more than a diameter of a groove for housing the inner seal material in the first aspect of the invention. Thus, a large unbalanced load caused as the differential pressure between pressures from both faces in the axial direction becomes large is not imposed on the stationary member 4, which does not become deformed and a seal leak from the seal parts with the seal materials can be prevented; a high-efficiency scroll compressor can be provided.

In the scroll compressor according to the fourth aspect of the invention, a liquid injection port of the fixed scroll and a liquid injection port of the stationary member are made to hermetically communicate with each other in a liquid injection seal in a clearance between the fixed scroll and the stationary member and a liquid injection pipe is connected to a liquid injection hole made in the radial direction of the stationary member communicating with the liquid injection port of the stationary member in the first aspect of the invention. Thus, the scroll compressor that can move the fixed scroll in the axial direction and has the liquid injection function can be provided.

The scroll compressor according to the fifth aspect of the invention further includes a liquid injection connection pipe for connecting the liquid injection pipe and the closed vessel, the liquid injection connection pipe having a large diameter part and a small diameter part and being shaped so as to increase in diameter toward the inside of the closed vessel and fixedly secured to the closed vessel in the large diameter part and the liquid injection pipe in the small diameter part in the fourth aspect of the invention. Thus, when the liquid injection pipe is inserted, if the positional accuracy between the liquid injection connection pipe connected to the closed vessel and the liquid injection hole of the stationary member is somewhat poor, the liquid injection pipe can be easily assembled with no problem on performance.

In the scroll compressor according to the sixth aspect of the invention, a notch is made in an entrance side corner of a groove for housing a seal material disposed in a clearance between the opposed faces of the bed plate of the fixed scroll and the stationary member in the first aspect of the invention. Thus, if the fixed scroll moves to the stationary member side at the relief operation time of liquid compression, etc., of the scroll compressor, the seal material is not caught between the fixed scroll and the stationary member and the relief operation is performed reliably.

What is claimed is:

1. A scroll compressor comprising:
    a fixed scroll formed with plate-like spiral teeth on one side of a bed plate;
    an orbiting scroll formed with plate-like spiral teeth on one side of a bed plate for defining a compression space in combination with the plate-like spiral teeth of said fixed scroll, said orbiting scroll being formed with an engagement part that is engaged with a main shaft receiving a driving force and that is located on an opposite side of the bed plate, said orbiting scroll making an orbiting motion relative to said fixed scroll;
    a frame fixedly secured to a closed vessel for supporting said orbiting scroll in an axial direction and the main shaft in a radial direction;
    a stationary member fixedly secured to said frame in a peripheral part thereof and placed facing the bed plate of said fixed scroll on an opposite side to the plate-like spiral teeth; and
    axial compliant means for permitting an axial motion of said fixed scroll,
    wherein a clearance is provided between the bed plate of said fixed scroll and said stationary member so that a high-pressure compression gas is introduced into a high-pressure chamber surrounded by an inner seal member between two radial surfaces within said clearance and an intermediate-pressure compression gas is introduced into an intermediate-pressure chamber surrounded by said inner seal member and an outer seal member between two radial surfaces within said clearance, to thereby press said fixed scroll against said orbiting scroll under pressure of the compression gases,
    wherein a recess communicating with the compression space is provided at a center of said stationary member,
    wherein a muffler is attached so as to surround said recess, and
    wherein a discharge hole directed in a radial direction is provided in said recess so that the compression gases are discharged through the discharge hole to an outside of the closed vessel.

2. The scroll compressor as claimed in claim 1 further comprising:
    a discharge pipe for discharging the compression gases to the outside of the closed vessel from the discharge hole that is directed in the radial direction and this is provided in said recess of said stationary member; and
    a discharge connection pipe for connecting said discharge pipe and the closed vessel,
    wherein said discharge connection pipe has a large diameter part and a small diameter part and shaped so as to increase in diameter toward an inside of the closed vessel, said discharge connection pipe being fixedly secured to the closed vessel in the large diameter part and said discharge pipe in the small diameter part.

3. The scroll compressor as claimed in claim 1, wherein each of an opening diameter of the muffler facing the stationary member and an opening diameter of the recess of said stationary member is equal to or less than a diameter of a groove accommodating therein the outer seal material, and equal to or more than a diameter of a groove accommodating therein the inner seal material.

4. A scroll compressor comprising:
    a fixed scroll formed with plate-like spiral teeth on one side of a bed plate;
    an orbiting scroll formed with plate-like spiral teeth on one side of a bed plate for defining a compression space in combination with the plate-like spiral teeth of said fixed scroll, said orbiting scroll being formed with an engagement part that is engaged with a main shaft receiving a driving force and that is located on an opposite side of the bed plate, said orbiting scroll making an orbiting motion relative to said fixed scroll;
    a frame fixedly secured to a closed vessel for supporting said orbiting scroll in an axial direction and the main shaft in a radial direction;
    a stationary member fixedly secured to said frame in a peripheral part thereof and placed facing the bed plate of said fixed scroll on an opposite side to the plate-like spiral teeth; and
    axial compliant means for permitting an axial motion of said fixed scroll,
    wherein a clearance is provided between the bed plate of said fixed scroll and said stationary member so that a high-pressure compression gas is introduced into a high-pressure chamber surrounded by an inner seal material within said clearance and an intermediate-pressure compression gas is introduced into an intermediate-pressure chamber surrounded by an inner seal member and an outer seal member within said clearance, to thereby press said fixed scroll against said orbiting scroll under pressure of the compression gases, wherein a recess communicating with the compression space is provided at a center of said stationary member, wherein a muffler is attached so as to surround said recess, and wherein a discharge hole directed in a radial direction is provided in said recess so that the compression gases are discharged through the discharge hole to an outside of the closed vessel, wherein a liquid injection port of said fixed scroll and a liquid injection port of said stationary member are hermetically communicated with each other in a liquid injection seal provided in the clearance between said fixed scroll and said stationary member, and wherein a liquid injection pipe is connected to a liquid injection hole provided in the radial direction of said stationary member, said liquid injection hole being communicated with the liquid injection port of said stationary member.

5. The scroll compressor as claimed in claim 4, further comprising:

a liquid injection connection pipe for connecting the liquid injection pipe and the closed vessel, said liquid injection connection pipe having a large diameter part and a small diameter part and being shaped so as to increase in diameter toward an inside of the closed vessel, said liquid injection connection pipe being fixedly secured to the closed vessel in the large diameter part and said liquid injection pipe in the small diameter part.

6. The scroll compressor as claimed in claim 1, wherein a notch is provided in an entrance side corner of a groove accommodating therein a seal material disposed in the clearance between the opposed faces of the bed plate of said fixed scroll and said stationary member.

* * * * *